United States Patent
Yamamoto et al.

(10) Patent No.: US 8,802,299 B2
(45) Date of Patent: Aug. 12, 2014

(54) NON-AQUEOUS ELECTROLYTE SECONDARY BATTERY

(75) Inventors: Hidekazu Yamamoto, Kobe (JP); Atsushi Fukui, Kobe (JP); Taizou Sunano, Kobe (JP); Maruo Kamino, Kobe (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 708 days.

(21) Appl. No.: 13/059,770

(22) PCT Filed: Aug. 4, 2009

(86) PCT No.: PCT/JP2009/063772
§ 371 (c)(1),
(2), (4) Date: Feb. 18, 2011

(87) PCT Pub. No.: WO2010/021236
PCT Pub. Date: Feb. 25, 2010

(65) Prior Publication Data
US 2011/0151338 A1    Jun. 23, 2011

(30) Foreign Application Priority Data

Aug. 20, 2008 (JP) .................... 2008-211569
Mar. 27, 2009 (JP) .................... 2009-077924

(51) Int. Cl.
| | |
|---|---|
| H01M 6/16 | (2006.01) |
| H01M 4/13 | (2010.01) |
| H01M 4/62 | (2006.01) |
| H01M 10/052 | (2010.01) |
| H01M 4/134 | (2010.01) |
| H01M 10/0567 | (2010.01) |
| H01M 10/0569 | (2010.01) |
| H01M 4/38 | (2006.01) |

(52) U.S. Cl.
CPC ............ H01M 10/052 (2013.01); H01M 4/622 (2013.01); Y02E 60/122 (2013.01); H01M 4/134 (2013.01); H01M 6/164 (2013.01); H01M 10/0567 (2013.01); H01M 10/0569 (2013.01); H01M 4/38 (2013.01); H01M 2300/0034 (2013.01)
USPC .......... 429/334; 429/217; 429/232; 429/330; 429/337; 429/338

(58) Field of Classification Search
USPC .......... 429/334, 212, 217, 232, 330, 337, 338
See application file for complete search history.

(56) References Cited

U.S. PATENT DOCUMENTS

| | | | |
|---|---|---|---|
| 6,905,762 B1 * | 6/2005 | Jow et al. ................ | 428/332 |
| 7,476,464 B2 * | 1/2009 | Hirose et al. ............. | 429/200 |
| 2005/0196670 A1 | 9/2005 | Yamaguchi et al. | |
| 2006/0141359 A1 | 6/2006 | Yanagida et al. | |
| 2007/0178379 A1 | 8/2007 | Tamura et al. | |

FOREIGN PATENT DOCUMENTS

| | | |
|---|---|---|
| CN | 1801520 A | 7/2006 |
| JP | 2002-352797 A | 12/2002 |
| JP | 2005-228565 A | 8/2005 |
| JP | 2005-317309 A | 11/2005 |
| JP | 2006-086058 A | 3/2006 |
| JP | 2006-164759 A | 6/2006 |
| JP | 2007-242411 A | 9/2007 |
| JP | 2008-053054 A | 3/2008 |

OTHER PUBLICATIONS

International Search Report, PCT/JP2009/063772, mailing dated on Oct. 27, 2009.
Notification of Transmittal of Translation of the International Preliminary Report on Patentability (Form PCT/IB/338) of International Application No. PCT/JP2009/063772 mailed Aug. 4, 2009 with Forms PCT/IB/373, PCT/ISA/237 and PCT/IB/326.

* cited by examiner

*Primary Examiner* — Patrick Ryan
*Assistant Examiner* — Julian Anthony
(74) *Attorney, Agent, or Firm* — Westerman, Hattori, Daniels & Adrian, LLP

(57) ABSTRACT

The present invention is made to improve charge-discharge cycle performances under high temperature environment in a non-aqueous electrolyte secondary battery using a negative electrode containing a negative electrode active material of particulate silicon and/or silicon alloy and a binding agent.
A non-aqueous electrolyte secondary battery according to the present invention includes a positive electrode 11, a negative electrode 12, a separator 13, and a non-aqueous electrolyte, wherein the negative electrode includes a negative electrode active material containing particulate silicon and/or silicon alloy and a binding agent, and the non-aqueous electrolyte contains fluorinated cyclic carbonate and a prescribed diisocyanate compound, and when Li storage volume per unit area of the negative electrode of the non-aqueous electrolyte secondary battery under charging condition is determined as A and the theoretical maximum Li storage volume per unit area of the negative electrode is determined as B, a utilizing rate (%) of negative electrode which is expressed by (A/B)×100 is 45% or less.

11 Claims, 2 Drawing Sheets

(A)

(B)

NON-AQUEOUS ELECTROLYTE SECONDARY BATTERY

TECHNICAL FIELD

The present invention relates to a non-aqueous electrolyte secondary battery comprising a positive electrode, a negative electrode, a separator interposed between the positive electrode and the negative electrode and a non-aqueous electrolyte dissolving a solute in a non-aqueous solvent. More particularly, the invention relates to a non-aqueous electrolyte secondary battery using particulate silicon and/or silicon alloy for a negative electrode active material of a negative electrode for the purpose of higher battery capacity, wherein a great decrease of capacity resulting from charging and discharging under high temperature environments is prevented and excellent charge-discharge cycle performances under high temperature environments can be obtained.

BACKGROUND ART

In recent years, as a power supply for a mobile electric device or electric power storage, a non-aqueous electrolyte secondary battery is in use, which employs a non-aqueous electrolyte and which is adapted for charging and discharging by way of transfer of lithium ions between a positive electrode and a negative electrode.

In such a non-aqueous electrolyte secondary battery, graphite material is in wide use as a negative electrode active material in a negative electrode. The use of graphite material has the following benefits. Since graphite material has a flat discharging electric potential and charging and discharging is performed by insertion and de-insertion of lithium ions among graphite crystals, generation of acicular metal lithium is prevented and volume change by charging and discharging hardly occurs.

On the other hand, in recent years, miniaturization and weight saving of mobile computing devices, such as a cellular phone, notebook PC, and PDA have been remarkably advanced. Further, power consumption has also been increasing associated with multi-functionalization. As a result, demand for miniaturization and weight saving in a non-aqueous electrolyte secondary battery used as these power supplies have been increasing.

However, the graphite material does not necessarily have a sufficient capacity and therefore is hard to sufficiently meet such demands.

Therefore, recently, the use of materials to be alloyed with lithium, such as silicon, germanium, and tin, has been examined as the negative electrode active material having a high capacity. Particularly, the use of silicon and silicon alloy as the negative electrode active material has been examined because silicon has a large theoretical capacity of about 4000 mAh/g.

However, in the case of using materials such as silicon to be alloyed with lithium, volume change associated with insertion and de-insertion of lithium is great and deterioration resulting from expansion during charging and discharging is caused. Further, materials such as silicon easily react with a commonly used non-aqueous electrolyte. Therefore, a negative electrode active material such as silicon is deteriorated by reaction between a non-aqueous electrolyte and itself, and there still remains a problem that charge-discharge cycle performances are lowered.

In this connection, as disclosed in patent document 1, there has been proposed a non-aqueous electrolyte secondary battery which comprises a negative electrode wherein a thin film of negative electrode active material containing materials to be alloyed with lithium is formed on the current collector and this thin film of the negative electrode active material is separated by gaps formed in the thickness direction into pillar shapes. Also, the parent document 1 has proposed to add carbonate compounds, particularly, a carbonate compound bonded with fluorine to a non-aqueous electrolyte solution used in the non-aqueous electrolyte secondary battery. Further, the patent document 1 discloses that, in such a non-aqueous electrolyte secondary battery, deterioration of the negative electrode active material by an expansion due to charging and discharging or by a reaction between a non-aqueous electrolyte and itself is suppressed.

In the patent document 2, there has been proposed to a battery using an electrolyte containing a diisocyanate compound having an aliphatic carbon chain. However, effects obtained by combination of the electrolyte and the negative electrode active material such as silicon have not been considered in the patent document 2.

PRIOR ART DOCUMENTS

Patent Documents

Patent document 1: JP-A 2006-86058
Patent document 2: JP-A 2007-242411

DISCLOSURE OF THE INVENTION

Problems to be Solved

The inventors of the present invention had examined charge-discharge cycle performances of a non-aqueous electrolyte secondary battery wherein silicon or silicon alloy is used as a negative electrode active material and carbonate chemical bonded with fluorine and ethylene carbonate chemical bonded with fluorine are contained in a non-aqueous electrolyte. The results of examination of the non-aqueous electrolyte secondary battery as described above employing a negative electrode wherein silicon or silicon alloy was formed on a negative electrode current collector by CVD method, sputtering method, vacuum deposition method, flame spraying method, and metal plating method showed that such a non-aqueous electrolyte secondary battery had excellent charge-discharge cycle performances even if being subjected to charging and discharging under high temperature environments.

On the other hand, in a non-aqueous electrolyte secondary battery employing a negative electrode comprising a negative electrode active material of particulate silicon and/or silicon alloy and a binger agent which is characterized that production is easier and production cost is lower as compared with the negative electrode as described above, carbonate chemical bonded with fluorine and ethylene carbonate chemical bonded with fluorine react with the negative electrode in the case of charging and discharging under high temperature environments. As a result, in such a non-aqueous electrolyte secondary battery, charge-discharge cycle performances are more deteriorated as compared with a non-aqueous electrolyte secondary battery comprising a non-aqueous electrolyte which contains neither carbonate chemical bonded with fluorine nor ethylene carbonate chemical bonded with fluorine.

It is an object of the invention to restrict great deterioration of charge-discharge cycle performances of a non-aqueous electrolyte secondary battery employing a negative electrode comprising a negative electrode active material containing particulate silicon and/or silicon alloy and a binding agent even if charging and discharging is conducted under high temperature environments so that excellent charge-discharge cycle performances can be obtained.

Means for Solving Problems

The present invention is made to solve the above-mentioned problems. A non-aqueous electrolyte secondary battery according to the present invention comprises: a positive electrode; a negative electrode; a separator interposed between the positive electrode and the negative electrode; and a non-aqueous electrolyte dissolving a solute in a non-aqueous solvent; wherein the negative electrode comprises a negative electrode active material containing particulate silicon and/or silicon alloy and a binding agent, wherein the non-aqueous electrolyte contains fluorinated cyclic carbonate and a diisocyanate compound of the general formula (1). When Li storage volume per unit area of the negative electrode of the non-aqueous electrolyte secondary battery under charging condition is determined as A and the theoretical maximum Li storage volume per unit area of the negative electrode is determined as B, a utilizing rate (%) of negative electrode which is expressed by (A/B)×100 is 45% or less.

OCN—CH$_2$-A-CH$_2$—NCO (1)

wherein A represents at least one selected from a saturated hydrocarbon group expressed by the general formula (a) below and an aromatic hydrocarbon group expressed by the general formula (b) below, and wherein R$_1$ and R$_2$ represents a hydrogen group and an alkyl group, and wherein two of R$_3$ to R$_8$ are combined with —CH$_2$—NCO in the above formula (1) and the other four represent the hydrogen group or the alkyl group.

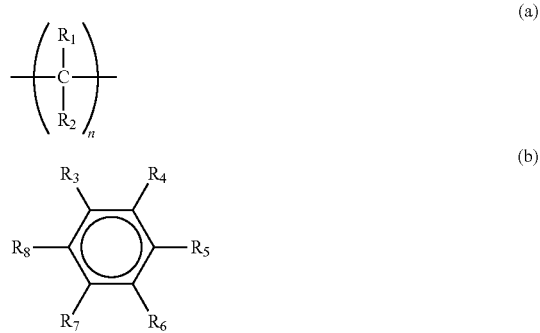

In the non-aqueous electrolyte secondary battery of the present invention, the negative electrode comprising the negative electrode active material containing particulate silicon and/or silicon alloy and the binding agent is preferably fabricated as follows. A negative electrode composite containing the negative electrode active material of particulate silicon and/or silicon alloy and the binding agent is applied on the surface of negative electrode current collector and is rolled, and sintered under a non-oxidizing atmosphere at a temperature which is not lower than a glass transition temperature of the binding agent. In such a fabrication method, an adhesive property among the negative electrode active material, and an adhesive property between the negative electrode active material and the negative electrode current collector are improved. As a result, detachment of the negative electrode active material from the negative electrode current collector caused by expansion and contraction of the negative electrode active material during charging and discharging is restricted.

As the binding agent, polyimide having a high strength is preferably used. The use of polyimide as the binding agent makes it possible to restrict expansion and deterioration of the negative electrode active material of particulate silicon and/or silicon alloy during charging and discharging.

Further, it is preferable that the negative electrode current collector having a surface roughness Ra of 0.2 μm or more is used. In the case where the negative electrode current collector having the surface roughness Ra of 0.2 μm or more is used, a contact area of the negative electrode active material and the negative electrode current collector is enlarged and the binding agent is entered into unevenness parts of the surface of the negative electrode current collector. Moreover, when sintering is conducted in such a condition, the adhesive property between the negative electrode active material and the negative electrode current collector is greatly enhanced by an anchoring effect. As a result, detachment of the negative electrode active material from the negative electrode current collector by expansion and contraction of the negative electrode active material during charging and discharging is more restricted.

Examples of the silicon alloy include a solid solution of silicon and at least one of other elements, an intermetallic compound of silicon and at least one of other elements, and an eutectic alloy of silicon and at least one of other elements. Further, examples of method of fabricating such a silicon alloy include arc melting method, rapid quenching method, mechanical alloying method, sputtering method, chemical vapor deposition method, and sintering method. In particular, examples of rapid quenching method include single roll method and twin roll method, and examples of atomizing method include gas atomizing method, water atomizing method and disk atomizing method.

As the diisocyanate compound expressed by the general formula (1), a straight chained diisocyanate compound expressed by the general formula (2) is preferably used.

OCN—(CH$_2$)$_x$—NCO (2)

In the straight chained diisocyanate compound expressed by the general formula (2), in a case where the number of aliphatic hydrocarbon group x is too small, activity ratio of hydrogen combined with carbon is raised and a side effect of diisocyanate compound is easily caused. As a result, battery characteristics are deteriorated. Therefore, it is preferable to use the straight chained diisocyanate compound expressed by the general formula (2) wherein the number of aliphatic hydrocarbon group x is within the range of 4 to 12, more preferably, within the range of 6 to 12. Examples of such a usable diisocyanate compound include 1,4-diisocyanate butane, 1,5-diisocyanate pentane, 1,6-diisocyanate hexane, 1,7-diisocyanate heptane, 1,8-diisocyanate octane, 1,9-diisocyanate nonane, 1,10-diisocyanate decane, 1,11-diisocyanate undecane, and 1,12-diisocyanate dodecane.

Further, as the diisocyanate compound expressed by the general formula (1), for example, diisocyanate compounds expressed by chemical formulas (3) to (5) are used.

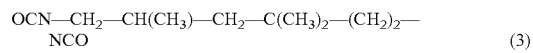
OCN—CH$_2$—CH(CH$_3$)—CH$_2$—C(CH$_3$)$_2$—(CH$_2$)$_2$—NCO (3)

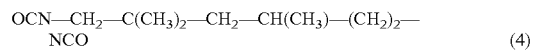
OCN—CH$_2$—C(CH$_3$)$_2$—CH$_2$—CH(CH$_3$)—(CH$_2$)$_2$—NCO (4)

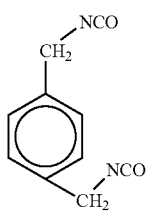

(5)

As fluorinated cyclic carbonate contained in the non-aqueous electrolyte, cyclic carbonate having a fluorine group expressed by the general formula (6) may be used. In particular, 4-fluoro-1,3-dioxolan-2-one having electrochemical stability is preferably used for the purpose of restricting expansion and deterioration of the negative electrode active material during charging and discharging and improving charge-discharge cycle performances of the non-aqueous electrolyte secondary battery. Further, in order to further improve charge-discharge cycle performances, it is preferable to use at least one selected from 4-fluoro-1,3-dioxolan-2-one and 4,5-difluoro-1,3-dioxolan-2-one.

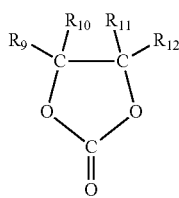

(6)

wherein $R_9$ to $R_{12}$ represents a group selected from a hydrogen group and a fluorine group and at least one is the fluorine group.

Effect of Invention

According to the present invention, in a non-aqueous electrolyte secondary battery using a negative electrode containing particulate silicon and/or silicon alloy and a binding agent, fluorinated cyclic carbonate and a diisocyanate compound of the general formula (1) are contained in a non-aqueous electrolyte, so that a reaction between the negative electrode active material and the non-aqueous electrolyte during charging and discharging under normal environments is restricted by fluorinated cyclic carbonate and charge-discharge cycle performances are improved.

According to the non-aqueous electrolyte secondary battery of the present invention, the diisocyanate compound of the general formula (1) is contained in the non-aqueous electrolyte and a resistance component is formed by the diisocyanate compound of the general formula (1) on the surface of the negative electrode. It is thought to be that this resistance component restricts a reaction between the fluorinated cyclic carbonate and the negative electrode under high temperature environments and prohibits deterioration of charge-discharge cycle performances under high temperature environments.

Further, according to the present invention, in a case where Li storage volume per unit area of the negative electrode of the non-aqueous electrolyte secondary battery under charging condition is determined as A and the theoretical maximum Li storage volume per unit area of the negative electrode is determined as B, when an utilizing rate (%) of negative electrode which is expressed by (A/B)×100 is 45% or less, expansion and contraction of the negative electrode active material during charging is restricted. As a result, charging and discharging may be stably repeated. In addition, activity of the negative electrode active material is not too high and the reaction between the negative electrode active material and the non-aqueous electrolyte is adequately restricted, so that the charging-discharging cycle performances are further improved.

As a result, according to the non-aqueous electrolyte secondary battery of the present invention, in a case where the negative electrode containing the negative electrode active material of particulate silicon and/or silicon alloy and the binding agent, excellent charge-discharge cycle performances may be obtained even under high temperature environments not only under normal environments.

BEST MODE FOR CARRYING OUT THE INVENTION

Figure 1:
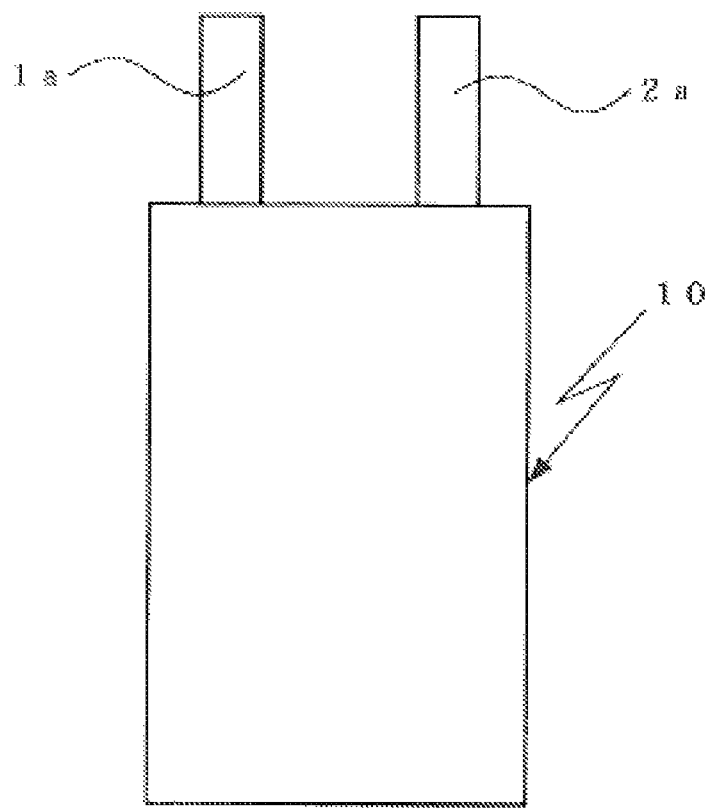
FIG. 1 are a partial cross-sectional explanatory view and a schematic perspective view illustrating a flat electrode fabricated in Examples and Comparative Examples of the present invention.
Figure 1:
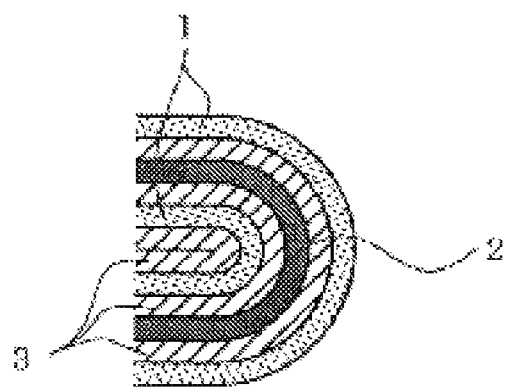

A non-aqueous electrolyte secondary battery according to the invention will hereinbelow be described in detail by way of examples thereof. It is to be noted that non-aqueous electrolyte secondary battery according to the invention is not limited to the following examples and may be practiced with suitable modifications made thereto so long as such modifications do not deviate from the scope of the invention.

Example 1

Fabrication of Battery

In Example 1, a positive electrode was prepared as follows. A positive electrode active material wherein zirconium was adhered to the surface of Lithium-cobalt oxide represented by $LiCoO_2$ having an average particle diameter of 13 μm and a BET specific surface area of 0.35 $m^2$/g was prepared. Next, this positive electrode active material, carbon material powder as a conductive agent, and polyvinylidene fluoride as a binding agent were mixed in a mass ratio of 95:2.5:2.5. Then, the resultant mixture was kneaded with N-methyl-2-pyrrolidone solution to give positive electrode composite slurry.

As a positive electrode current collector, an aluminum foil having 15 μm thickness, 402 mm length, and 50 mm width was used. The positive electrode composite slurry was applied on one side of the positive electrode current collector. Here, the length and width of the positive electrode composite slurry applied on the one side of the positive electrode current collector were 340 mm and 50 mm. Next, the positive electrode composite slurry was applied on the other side of the positive electrode current collector. Here, the length and width of the positive electrode composite slurry applied on the other side of the positive electrode current collector were 271 mm and 50 mm. Then, the resultant was dried and rolled. Here, the positive electrode had a thickness of 143 μm thickness, the positive electrode composite on the positive electrode current collector was 48 mg/cm², and the filling density of the positive electrode composite was 3.75 g/cc.

After that, a positive electrode current collector tub of aluminum flat plate having 70 μm thickness, 35 mm length, and 4 mm width was installed on the area which the positive electrode composite was not applied on.

As the positive electrode active material, any publicly known positive electrode active material which has conventionally been used may be employed. Examples of the positive electrode active material include lithium-containing transition metal oxide, such as lithium-cobalt composite oxide for example $LiCoO_2$, lithium-nickel composite oxide for example $LiNiO_2$, lithium-manganese composite oxide for example $LiMn_2O_4$ and $LiMnO_2$, lithium-nickel-cobalt composite oxide for example $LiNi_{1-x}CO_xO_2$ (0<x<1), lithium-manganese-cobalt composite oxide for example $LiMn_{1-x}CO_xO_2$ (0<x<1), lithium-nickel-cobalt-manganese composite oxide for example $LiNi_xCO_yMn_zO_2$ (x+y+z=1), and lithium-nickel-cobalt-aluminum composite oxide for example $LiNi_xCO_yAl_zO_2$ (x+y+z=1).

Here, in a case where lithium-cobalt oxide $LiCoO_2$ is used as the positive electrode active material, zirconium is preferably adhered on the surface thereof. As a result, the crystal structure of $LiCoO_2$ is stabilized and charge-discharge cycle performances are improved. Also, a side reaction except for charge-discharge reaction is restricted on the interface between the positive electrode active material and the non-aqueous electrolyte.

Fabrication of Negative Electrode

A negative electrode was prepared as follows. A silicon powder having an average particle diameter of 10 μm and a purity of 99.9% was used as a negative electrode active material. The silicon powder as the negative electrode active material, graphite powder as a conductive agent, and thermoplastic polyimide having a glass transition temperature of 295° C. as a binding agent, were weighed out in a mass ratio of 87:3:7.5 and were blended with a solution of N-methyl-2-pyrrolidone to give negative electrode composite slurry.

As a negative electrode current collector, Cu—Ni—Si—Mg (Ni: 3 wt %, Si: 0.65 wt %, Mg: 0.15 wt %) alloy foil having a surface roughness Ra of 0.3 μm and a thickness of 20 μm was used. Then, the foregoing negative electrode composite slurry was applied on both sides of the negative electrode current collector and then was dried. Here, the amount of the negative electrode composite on the negative electrode current collector was 5.6 mg/cm².

The resultant negative electrode current collector was cut into a rectangle of 380 mm length and 52 mm width and then rolled. After that, the resultant material was sintered by heat-treatment at 400° C. for 10 hours under argon atmosphere. Thus, a negative electrode after sintering had a thickness of 56 μm.

Next, a negative electrode current collector tub made of a nickel flat plate having 70 μm thickness, 35 mm length and 4 mm width was installed on the edge area of the negative electrode.

Preparation of a Non-Aqueous Electrolyte

A non-aqueous electrolyte was prepared as follows. A non-aqueous solvent mixture was prepared by mixing methyl ethyl carbonate (MEC) and 4-fluoro-1,3-dioxolan-2-one (FEC) of fluorinated cyclic carbonate in a volume ratio of 20:80. Then, a solute of $LiPF_6$ was dissolved in the resultant solvent mixture in a concentration of 1.0 mol/l. Further, 0.4 mass % of carbon dioxide was dissolved in the resultant mixture. Still further, 1.0 mass % of 1,6-diisocyanate hexane (diisocyanate A), which was a straight chained diisocyanate compound wherein the number of aliphatic hydrocarbon group was 6, was added to the resultant mixture to prepare the non-aqueous electrolyte.

In the non-aqueous electrolyte, any lithium salt that has conventionally been used may be employed as the solute to be dissolved in the non-aqueous solvent. Examples include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, which may be used either alone or in combination. In addition to these lithium salts, a lithium salt which has oxalate complex as an anion may preferably be contained. Examples of usable lithium salt which has oxalate complex as the anion include lithium-bis (oxalate)borate.

A non-aqueous electrolyte secondary battery was fabricated in the following manner. Two sheets of porous made of polyethylene having 22 μm thickness, 430 mm length and 54.5 mm width were used as a separator. As illustrate in FIGS. 1 (A) and 1(B), a positive electrode 1 and a negative electrode 2 were disposed to face each other by interposing a separator 3. These components were bent at prescribed position and spirally coiled and pressed to fabricate a flat electrode 10. A positive electrode current collector tub 1a installed on the positive electrode 1 and a negative electrode current collector tub 2a installed on the negative electrode 2 were protruded from the flat electrode 10.

Figure 2:
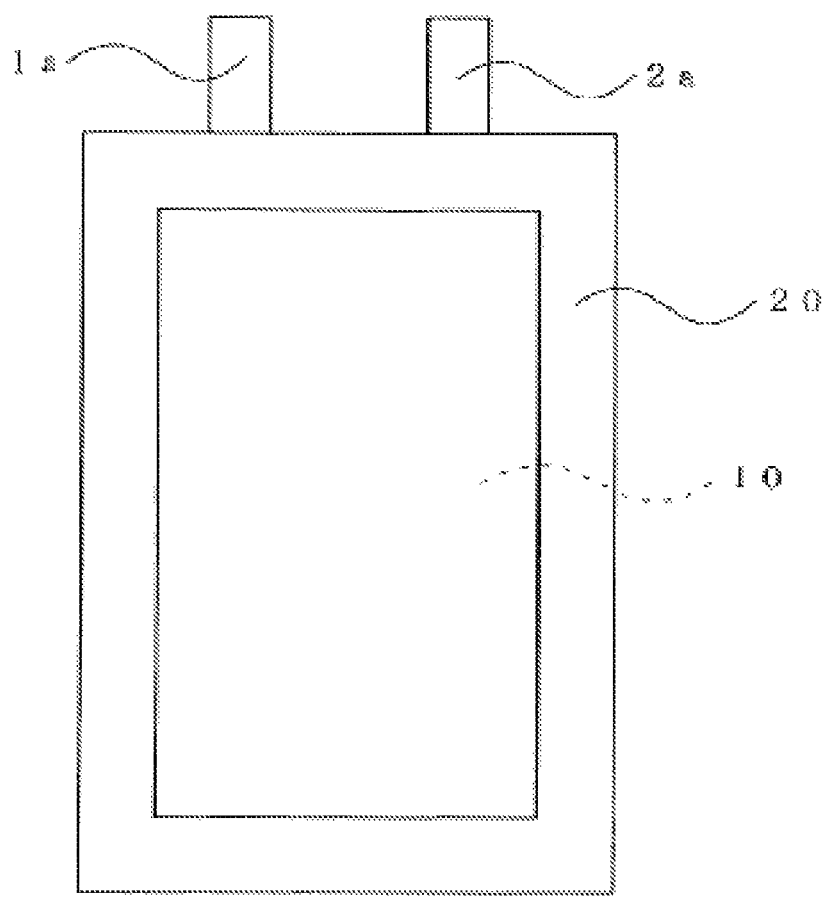
FIG. 2 is a schematic plain view illustrating a non-aqueous electrolyte secondary battery fabricated in Examples and Comparative Examples of the invention.

Next, as illustrated in FIG. 2, the flat electrode 10 was accommodated in a battery case 20 composed of aluminum laminate film, and the non-aqueous electrolyte prepared was poured into the battery case 20. Then, the open area of the battery case 20 was sealed so that the positive electrode current collector tub 1a and the negative electrode current collector tub 2a were thrust out. Thus, a non-aqueous electrolyte secondary battery having a design capacity of 950 mAh was obtained.

Example 2

In Example 2, in preparation of the non-aqueous electrolyte of Example 1, the amount of 1,6-diisocyanate hexane (diisocyanate A) of the straight chained diisocyanate compound added to the non-aqueous electrolyte was changed to 2 mass %. Except for the above, the same procedure as in Example 1 was used to fabricate a non-aqueous electrolyte secondary battery of Example 2 having a design capacity of 950 mAh.

Example 3

In Example 3, in preparation of the non-aqueous electrolyte of Example 1, the amount of 1,6-diisocyanate hexane (diisocyanate A) of the straight chained diisocyanate compound added to the non-aqueous electrolyte was changed to 5 mass %. Except for the above, the same procedure as in Example 1 was used to fabricate a non-aqueous electrolyte secondary battery of Example 3 having a design capacity of 950 mAh.

Example 4

In Example 4, in preparation of the non-aqueous electrolyte of Example 1, the amount of 1,6-diisocyanate hexane (diisocyanate A) of the straight chained diisocyanate compound added to the non-aqueous electrolyte was changed to 10 mass %. Except for the above, the same procedure as in Example 1 was used to fabricate a non-aqueous electrolyte secondary battery of Example 4 having a design capacity of 950 mAh.

Example 5

In Example 5, in preparation of the non-aqueous electrolyte of Example 1, the amount of 1,6-diisocyanate hexane (diisocyanate A) of the straight chained diisocyanate compound added to the non-aqueous electrolyte was changed to 0.1 mass %. Except for the above, the same procedure as in Example 1 was used to fabricate a non-aqueous electrolyte secondary battery of Example 5 having a design capacity of 950 mAh.

Example 6

In Example 6, in preparation of the non-aqueous electrolyte of Example 1, the amount of 1,6-diisocyanate hexane (diisocyanate A) of the straight chained diisocyanate compound added to the non-aqueous electrolyte was changed to 0.2 mass %. Except for the above, the same procedure as in Example 1 was used to fabricate a non-aqueous electrolyte secondary battery of Example 6 having a design capacity of 950 mAh.

Example 7

In Example 7, in preparation of the non-aqueous electrolyte of Example 1, the amount of 1,6-diisocyanate hexane (diisocyanate A) of the straight chained diisocyanate compound added to the non-aqueous electrolyte was changed to 0.5 mass %. Except for the above, the same procedure as in Example 1 was used to fabricate a non-aqueous electrolyte secondary battery of Example 7 having a design capacity of 950 mAh.

Comparative Example 1

In Comparative Example 1, in preparation of the non-aqueous electrolyte of Example 1, 1,6-diisocyanate hexane (diisocyanate A) of the straight chained diisocyanate compound was not added. That is, a non-aqueous electrolyte of Comparative Example 1 was comprised of the non-aqueous solvent mixture prepared by mixing methyl ethyl carbonate (MEC) and 4-fluoro-1,3-dioxolan-2-one (FEC) of fluorinated cyclic carbonate in a volume ratio of 20:80 and the solute of $LiPF_6$ dissolved in the concentration of 1.0 mol/l. Except for the above, the same procedure as in Example 1 was used to fabricate a non-aqueous electrolyte secondary battery of Comparative Example 1 having a design capacity of 950 mAh.

Comparative Example 2

In Comparative Example 2, in preparation of the non-aqueous electrolyte of Example 1, instead of 1,6-diisocyanate hexane (diisocyanate A) of the straight chained diisocyanate compound, 2 mass % of vinylene carbonate (VC) was added to the non-aqueous electrolyte. Except for the above, the same procedure as in Example 1 was used to fabricate a non-aqueous electrolyte secondary battery of Comparative Example 2 having a design capacity of 950 mAh.

Comparative Example 3

In Comparative Example 3, in preparation of the non-aqueous electrolyte of Example 1, a non-aqueous solvent mixture was prepared by mixing methyl ethyl carbonate (MEC) and 1,3-dioxolan-2-one (EC) of non-fluorinated cyclic carbonate in a volume ratio of 20:80, and the solute of $LiPF_6$ was dissolved thereto in the concentration of 1.0 mol/l. Except for the above, the same procedure as in Example 1 was used to fabricate a non-aqueous electrolyte secondary battery of Comparative Example 3 having a design capacity of 950 mAh.

Comparative Example 4

In Comparative Example 4, in preparation of the non-aqueous electrolyte of Example 1, a non-aqueous solvent mixture was prepared by mixing methyl ethyl carbonate (MEC) and 1,3-dioxolan-2-one (EC) of non-fluorinated cyclic carbonate in a volume ratio of 20:80, and the solute of $LiPF_6$ was dissolved thereto in the concentration of 1.0 mol/l. Furthermore, 2 mass % of 1,6-diisocyanate hexane (diisocyanate A) of the straight chained diisocyanate compound was added.

Except for the above, the same procedure as in Example 1 was used to fabricate a non-aqueous electrolyte secondary battery of Comparative Example 4 having a design capacity of 950 mAh.

Comparative Example 5

Fabrication of Positive Electrode

In Comparative Example 5, in fabrication of the positive electrode of Example 1, the amount of the positive electrode composite slurry applied on the positive electrode current collector was changed so that the thickness of the positive electrode was 90 μm, the positive electrode composite on the positive electrode current collector was 28 mg/cm$^2$, and the filling density of the positive electrode composite was 3.75 g/cc.

Fabrication of Negative Electrode

In fabrication of a negative electrode, Cu—Ni—Si—Mg (Ni: 3 wt %, Si: 0.65 wt %, Mg: 0.15 wt %) alloy foil having a surface roughness Ra of 0.3 μm and a thickness of 26 μm was used as a negative electrode current collector. The both sides of the negative electrode current collector were irradiated by Ar ion beam having a pressure of 0.05 Pa and an ion current density of 0.27 mA/cm$^2$. After that, single crystal silicon was used as vapor deposition material to form a silicon thin film by electron beam deposition method on the both sides of the negative electrode current collector.

A cross section of the negative electrode current collector on which surface the silicon thin film was formed was observed by SEM and a film thickness of the silicon thin film was measured. The results of measurement showed that the silicon thin film having a thickness of about 10 μm was formed on the both sides of the negative electrode current collector. Next, the silicon thin film was subjected to a Raman spectrometer. According to the results of measurement, a peak in the vicinity of 480 cm$^{-1}$ of wavelength was detected, but a peak in the vicinity of 520 cm$^{-1}$ was not detected. Thus, it was found that the silicon thin film was an amorphous silicon thin film.

The negative electrode current collector on which surface the silicon thin film was formed was cut into a rectangle of 380 mm length and 52 mm width. Next, as the same as Example 1, a negative electrode current collector tub was installed. Thus, a negative electrode was prepared.

In Comparative Example 5, in preparation of the non-aqueous electrolyte of Example 1, as the same as Comparative Example 1, 1,6-diisocyanate hexane (diisocyanate A) of the straight chained diisocyanate compound was not added.

Except for the above, the same procedure as in Example 1 was used to fabricate a non-aqueous electrolyte secondary battery of Comparative Example 5 having a design capacity of 600 mAh.

In each of the non-aqueous electrolyte secondary batteries of Examples 1 to 7 and Comparative Examples 1 to 5, as to each negative electrode under charging condition, when Li storage volume per unit area was determined as A and the theoretical maximum Li storage volume per unit area was determined as B, an utilizing rate of negative electrode (%) as expressed by (A/B)×100 was 40%.

Next, each of the non-aqueous electrolyte secondary batteries of Examples 1 to 7 and Comparative Examples 1 to 4 having the design capacity of 950 mAh was subjected to an initial charging and discharging under room temperature of 25° C. Each of the non-aqueous electrolyte secondary batteries was charged at a constant current of 190 mA until the voltage became 4.2 V. Further, each of the non-aqueous electrolyte secondary batteries was charged at the constant voltage of 4.2 V until the current became 48 mA and then discharged at the constant current of 190 mA until the voltage became 2.75 V. Thus, the initial charging and discharging was performed.

Then, each of the non-aqueous electrolyte secondary batteries of Examples 1 to 7 and Comparative Examples 1 to 4 after initial charging and discharging was charged and discharged under room temperature of 25° C. in cycles as follows. In one cycle, each of the non-aqueous electrolyte secondary batteries was charged at a constant current of 950 mA until the voltage became 4.2 V and further charged at a constant voltage of 4.2 V until the current became 47 mA and thereafter discharged at the constant current of 950 mA until the voltage became 2.75 V. Such a charging and discharging cycle was repeated one hundred fifty times.

As to each of the non-aqueous electrolyte secondary batteries of Examples 1 to 7 and Comparative Examples 1 to 4, a discharge capacity Q1 at the first cycle and a discharge capacity Q150 at the one hundred fiftieth cycle were determined. Then, the discharge capacities determined were applied to the following equation to find a percentage of capacity preservation at the one hundred fiftieth cycle under room temperature of 25° C.

$$\text{Percentage of capacity preservation}(\%)=(Q150/Q1)\times 100$$

Next, each of the non-aqueous electrolyte secondary batteries of Examples 1 to 7 and Comparative Examples 1 to 4 after initial charging and discharging was charged and discharged under high temperature of 45° C. in cycles as follows. In one cycle, each of the non-aqueous electrolyte secondary batteries was charged at a constant current of 950 mA until the voltage became 4.2 V and further charged at a constant voltage of 4.2 V until the current became 47 mA and thereafter discharged at the constant current of 950 mA until the voltage became 2.75 V. Such a charging and discharging cycle was repeated one hundred fifty times.

As to each of the non-aqueous electrolyte secondary batteries of Examples 1 to 7 and Comparative Examples 1 to 4, a discharge capacity Q1 at the first cycle and a discharge capacity Q150 at the one hundred fiftieth cycle were determined. Then, a percentage of capacity preservation at the one hundred fiftieth cycle under high temperature of 45° C. was determined.

As to the non-aqueous electrolyte secondary battery of Comparative Example 5 having the design capacity of 600 mAh, an initial charging and discharging was conducted under room temperature of 25° C. as follows. The non-aqueous electrolyte secondary battery was charged at a constant current of 120 mA until the voltage became 4.2 V. Further, the non-aqueous electrolyte secondary battery was charged at the constant voltage of 4.2 V until the current became 30 mA and then discharged at the constant current of 120 mA until the voltage became 2.75 V.

Then, the non-aqueous electrolyte secondary battery of Comparative Example 5 after initial charging and discharging was charged and discharged under room temperature of 25° C. in cycles as follows. In one cycle, the non-aqueous electrolyte secondary battery of Comparative Example 5 was charged at a constant current of 600 mA until the voltage became 4.2 V and further charged at a constant voltage of 4.2 V until the current became 30 mA, and thereafter discharged at the constant current of 600 mA until the voltage became 2.75 V. Such a charging and discharging cycle was repeated one hundred fifty times.

As to the non-aqueous electrolyte secondary battery of Comparative Example 5, a discharge capacity Q1 at the first cycle and a discharge capacity Q150 at the one hundred fiftieth cycle were determined. Then, a percentage of capacity preservation at the one hundred fiftieth cycle under room temperature of 25° C. was determined.

Then, the non-aqueous electrolyte secondary battery of Comparative Example 5 after initial charging and discharging was charged and discharged under high temperature of 45° C. in cycles as follows. In one cycle, the non-aqueous electrolyte secondary battery of Comparative Example 5 was charged at a constant current of 600 mA until the voltage became 4.2 V and further charged at a constant voltage of 4.2 V until the current became 30 mA, and thereafter discharged at the constant current of 600 mA until the voltage became 2.75 V. Such a charging and discharging cycle was repeated one hundred fifty times.

As to the non-aqueous electrolyte secondary battery of Comparative Example 5, a discharge capacity Q1 at the first cycle and a discharge capacity Q150 at the one hundred fiftieth cycle were determined. Then, a percentage of capacity preservation at the one hundred fiftieth cycle under high temperature of 45° C. was determined.

Then, as to each of the non-aqueous electrolyte secondary batteries of Examples 1 to 7 and Comparative Examples 1 to 5, each cycle life under room temperature of 25° C. and under high temperature of 45° C. was determined by using an index wherein the percentage of capacity preservation of Example 1 at one hundred fiftieth cycle under room temperature of 25° C. was defined as cycle life 100. The results are shown in Table 1 below.

TABLE 1

| | Adhesion Method of Negative electrode active material | Non-aqueous electrolyte | | | | | Utilizing Rate of Negative Electrode (%) | Cycle life | |
| | | Type and Volume Ratio of Non-aqueous solvent | | | Additive Agent (Mass %) | | | | |
| | | FEC | EC | MEC | Diisocyanate A | VC | | Room Temperature | High Temperature |
|---|---|---|---|---|---|---|---|---|---|
| Ex. 1 | Application | 20 | — | 80 | 1 | — | 40 | 100 | 99 |
| Ex. 2 | Application | 20 | — | 80 | 2 | — | 40 | 100 | 99 |
| Ex. 3 | Application | 20 | — | 80 | 5 | — | 40 | 99 | 100 |
| Ex. 4 | Application | 20 | — | 80 | 10 | — | 40 | 92 | 100 |
| Ex. 5 | Application | 20 | — | 80 | 0.1 | — | 40 | 100 | 93 |
| Ex. 6 | Application | 20 | — | 80 | 0.2 | — | 40 | 99 | 94 |
| Ex. 7 | Application | 20 | — | 80 | 0.5 | — | 40 | 100 | 97 |
| Comp. Ex. 1 | Application | 20 | — | 80 | — | — | 40 | 99 | 65 |
| Comp. Ex. 2 | Application | 20 | — | 80 | — | 2 | 40 | 99 | 70 |
| Comp. Ex. 3 | Application | — | 20 | 80 | — | — | 40 | 72 | 81 |
| Comp. Ex. 4 | Application | — | 20 | 80 | 2 | — | 40 | 70 | 82 |
| Comp. Ex. 5 | Vapor deposition | 20 | — | 80 | — | — | 40 | 93 | 92 |

The results show that, in comparison among the non-aqueous electrolyte secondary batteries of Examples 1 to 7 and Comparative Examples 1 to 4 which used the negative electrode applying the particulate silicon of the negative electrode active material and the binding agent on the negative electrode current collector, the cycle life under room temperature of each of the non-aqueous electrolyte secondary batteries of Examples 1 to 7 and Comparative Examples 1 and 2 which used the non-aqueous electrolyte containing fluorinated cyclic carbonate was greatly improved as compared with each of the non-aqueous electrolyte secondary batteries of Comparative Examples 3 and 4 which used the non-aqueous electrolyte not containing fluorinated cyclic carbonate.

Further, in each of the non-aqueous electrolyte secondary batteries of Examples 1 to 7 using the non-aqueous electrolyte containing the diisocyanate compound in addition to fluorinated cyclic carbonate, the cycle life under room temperature and the cycle life under high temperature were almost same.

On the other hand, in each of the non-aqueous electrolyte secondary batteries of Comparative Examples 1 and 2 using the non-aqueous electrolyte containing fluorinated cyclic carbonate and not containing diisocyanate compound, the cycle life under high temperature was greatly decreased as compared with the cycle life under room temperature. In addition, as in the non-aqueous electrolyte secondary battery of Comparative Example 2, even when vinylene carbonate (VC) which is thought to form the resistance component on the surface of the negative electrode was added, decrease of cycle life under high temperature was not restricted. Further, in each of the non-aqueous electrolyte secondary batteries of Comparative Examples 1 and 2, cycle life under high temperature was more deteriorated as compared with each of the non-aqueous electrolyte secondary batteries of Comparative Examples 3 and 4 using the non-aqueous electrolyte not containing fluorinated cyclic carbonate.

Still further, in the non-aqueous electrolyte secondary battery of Comparative Example 5 using the negative electrode wherein silicon of the negative electrode active material was vapor-deposited on the negative electrode current collector, although the diisocyanate compound was not added to the non-aqueous electrolyte containing fluorinated cyclic carbonate, the cycle life under room temperature and the cycle life under high temperature were almost same.

Accordingly, the suppression of decrease of the cycle life under high temperature by addition of diisocyanate compound to the non-aqueous electrolyte containing fluorinated cyclic carbonate is found to be peculiar effect obtained in the non-aqueous electrolyte secondary battery which used the negative electrode applying the particulate silicon of negative electrode active material and the binding agent on the negative electrode current collector.

Further, in comparison among the non-aqueous electrolyte secondary batteries of Examples 1 to 7, in accordance with increment of the additive amount of diisocyanate compound to the non-aqueous electrolyte containing fluorinated cyclic carbonate, while the cycle life under room temperature was decreased, the cycle life under high temperature was improved.

Example 8

In Example 8, in preparation of the non-aqueous electrolyte of Example 1, 1 mass % of 1,4-diisocyanate butane (diisocyanate B) wherein the number of aliphatic hydrocarbon group was 4 was added as the straight chained diisocyanate compound to the non-aqueous electrolyte. Except for the above, the same procedure as in Example 1 was used to fabricate a non-aqueous electrolyte secondary battery of Example 8 having a design capacity of 950 mAh.

Example 9

In Example 9, in preparation of the non-aqueous electrolyte of Example 1, 1 mass % of 1,8-diisocyanate octane (diisocyanate C) wherein the number of aliphatic hydrocarbon group was 8 was added as the straight chained diisocyanate compound to the non-aqueous electrolyte. Except for the above, the same procedure as in Example 1 was used to fabricate a non-aqueous electrolyte secondary battery of Example 9 having a design capacity of 950 mAh.

Example 10

In Example 10, in preparation of the non-aqueous electrolyte of Example 1, 1 mass % of 1,12-diisocyanate decane (diisocyanate D) wherein the number of aliphatic hydrocarbon group was 12 was added as the straight chained diisocyanate compound to the non-aqueous electrolyte. Except for the above, the same procedure as in Example 1 was used to fabricate a non-aqueous electrolyte secondary battery of Example 10 having a design capacity of 950 mAh.

Example 11

In Example 11, in preparation of the non-aqueous electrolyte of Example 1, 1 mass % of diisocyanate E wherein a diisocyanate compound expressed by the chemical formula (3) and a diisocyanate compound expressed by the chemical formula (4) were mixed in a ratio of 1:1 was added as the diisocyanate compound to the non-aqueous electrolyte. Except for the above, the same procedure as in Example 1 was used to fabricate a non-aqueous electrolyte secondary battery of Example 11 having a design capacity of 950 mAh.

Example 12

In Example 12, in preparation of the non-aqueous electrolyte of Example 1, 1 mass % of diisocyanate F expressed by the chemical formula (5) was added as the diisocyanate compound to the non-aqueous electrolyte. Except for the above, the same procedure as in Example 1 was used to fabricate a non-aqueous electrolyte secondary battery of Example 12 having a design capacity of 950 mAh.

Comparative Example 6

In Comparative Example 6, in preparation of the non-aqueous electrolyte of Example 1, 1 mass % of hexyl isocyanate wherein an isocyanate group was 1 was added to the non-aqueous electrolyte. Except for the above, the same procedure as in Example 1 was used to fabricate a non-aqueous electrolyte secondary battery of Comparative Example 6 having a design capacity of 950 mAh.

Comparative Example 7

In Comparative Example 7, in preparation of the non-aqueous electrolyte of Example 1, 1 mass % of diisocyanate G expressed by chemical formula (7) was added as the diisocyanate compound to the non-aqueous electrolyte. Except for the above, the same procedure as in Example 1 was used to fabricate a non-aqueous electrolyte secondary battery of Comparative Example 7 having a design capacity of 950 mAh.

(7)

Comparative Example 8

In Comparative Example 8, in preparation of the non-aqueous electrolyte of Example 1, 1 mass % of diisocyanate H expressed by chemical formula (8) was added as the diisocyanate compound to the non-aqueous electrolyte. Except for the above, the same procedure as in Example 1 was used to fabricate a non-aqueous electrolyte secondary battery of Comparative Example 8 having a design capacity of 950 mAh.

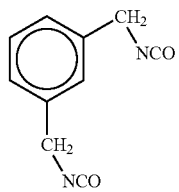

(8)

Comparative Example 9

In Comparative Example 9, in preparation of the non-aqueous electrolyte of Example 1, 1 mass % of diisocyanate I expressed by chemical formula (9) was added as the diisocyanate compound to the non-aqueous electrolyte. Except for the above, the same procedure as in Example 1 was used to fabricate a non-aqueous electrolyte secondary battery of Comparative Example 9 having a design capacity of 950 mAh.

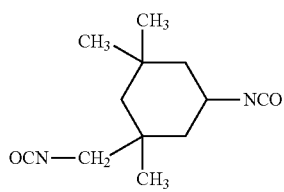

(9)

In each of the non-aqueous electrolyte secondary batteries of Examples 8 to 12 and Comparative Examples 6 to 9, the utilizing rate of negative electrode (%) was 40%.

As the same as the non-aqueous electrolyte secondary battery of Example 1, each of the non-aqueous electrolyte secondary batteries of Examples 8 to 12 and Comparative Examples 6 to 9 was subjected to the charging and discharging. Then, as to each of the non-aqueous electrolyte secondary batteries of Examples 8 to 12 and Comparative Examples 6 to 9, each cycle life under room temperature of 25° C. and under high temperature of 45° C. was determined by using the index wherein the percentage of capacity preservation of Example 1 at one hundred fiftieth cycle under room temperature of 25° C. was defined as cycle life 100. The results are shown in Table 2 below.

TABLE 2

| | Adhesion Method of Negative electrode active material | Non-aqueous electrolyte | | | | Utilizing Rate of Negative Electrode (%) | Cycle life | |
|---|---|---|---|---|---|---|---|---|
| | | Type and Volume Ratio of Non-aqueous solvent | | Additive Agent | | | Room Temperature | High Temperature |
| | | FEC | MEC | Type | Mass % | | | |
| Ex. 1 | Application | 20 | 80 | Diisocyanate A | 1 | 40 | 100 | 99 |
| Ex. 8 | Application | 20 | 80 | Diisocyanate B | 1 | 40 | 100 | 93 |
| Ex. 9 | Application | 20 | 80 | Diisocyanate C | 1 | 40 | 100 | 100 |
| Ex. 10 | Application | 20 | 80 | Diisocyanate D | 1 | 40 | 100 | 99 |
| Ex. 11 | Application | 20 | 80 | Diisocyanate E | 1 | 40 | 100 | 85 |
| Ex. 12 | Application | 20 | 80 | Diisocyanate F | 1 | 40 | 100 | 72 |
| Comp. Ex. 6 | Application | 20 | 80 | Hexyl isocyanate | 1 | 40 | 99 | 68 |
| Comp. Ex. 7 | Application | 20 | 80 | Diisocyanate G | 1 | 40 | 99 | 58 |
| Comp. Ex. 8 | Application | 20 | 80 | Diisocyanate H | 1 | 40 | 90 | 62 |
| Comp. Ex. 9 | Application | 20 | 80 | Diisocyanate I | 1 | 40 | 99 | 60 |

The results show that in the non-aqueous electrolyte secondary batteries of Examples 1 and 8 to 12 which used the negative electrode applying the particulate silicon of the negative electrode active material and the binding agent on the negative electrode current collector and the non-aqueous electrolyte containing fluorinated cyclic carbonate and diisocyanates A to F expressed by the general formula (1), each cycle life under room temperature of 25° C. and under high temperature of 45° C. was more improved as compared with each of the non-aqueous electrolyte secondary batteries of Comparative Examples 6 and 9.

The reason is thought to be as follows. In the non-aqueous electrolyte secondary battery of Comparative Example 6 using the non-aqueous electrolyte containing hexyl isocyanate wherein the number of isocyanate group was one and in the non-aqueous electrolyte secondary batteries of Comparative Examples 7 to 9 using the non-aqueous electrolyte containing diisocyanate G to I which were not the diisocianate expressed by the general formula (1), it was impossible to restrict a reaction between the negative electrode and the non-aqueous electrolyte under high temperature of 45° C.

As to the non-aqueous electrolyte secondary batteries of Examples 1 and 8 to 12, in each of the non-aqueous electrolyte secondary batteries of Examples 1, 9 and 10 which utilized the non-aqueous electrolyte dissolving diisocyanate A, C and D having the number of straight-chained aliphatic hydrocarbon group of 6 or more, the cycle life under high temperature of 45° C. were more improved as compared with the non-aqueous electrolyte secondary battery of Example 8 which utilized the non-aqueous electrolyte dissolving diisocyanate B having the number of straight-chained aliphatic hydrocarbon group of 4. Accordingly, it is preferable to use a diisocyanate compound wherein the number of straight-chained aliphatic hydrocarbon group in the diisocyanate compound is 6 or more. On the other hand, in the non-aqueous electrolyte secondary battery of Example 11 which utilized the non-aqueous electrolyte dissolving diisocyanate E wherein a side-chain existed in an aliphatic hydrocarbon group and the non-aqueous electrolyte secondary battery of Example 12 which utilized the non-aqueous electrolyte dissolving diisocyanate F wherein an aromatic hydrocarbon existed, the cycle life under high temperature of 45° C. was more decreased as compared with the non-aqueous electrolyte secondary battery of Example 8. The reason is supposed to be as follows. In diisocyanate E and diisocyanate F, the effect of steric hindrance was large and therefore, the reaction between the negative electrode and the non-aqueous electrolyte was not fully restricted, so that the cycle life under high temperature of 45° C. was decreased.

Example 13

In Example 13, in preparation of the positive electrode of Example 1, the amount of the positive electrode composite slurry applied on the positive electrode current collector was changed. Thus, a positive electrode of Example 13 having a thickness of 151 μm, an amount of the positive electrode composite on the positive electrode current collector of 51 mg/cm$^2$, and a filling density of positive electrode composite of 3.75 g/cc was prepared.

In Example 13, in preparation of the negative electrode of Example 1, the amount of the negative electrode composite slurry applied on the negative electrode current collector was changed. Thus, a negative electrode of Example 13 in which an amount of the negative electrode composite applied on the negative electrode current collector was 4.9 mg/cm$^2$ was prepared. The negative electrode of Example 13 after sintering had a thickness of 40 μm.

Then, the positive electrode and the negative electrode prepared as above and the non-aqueous electrolyte of Example 1 were used to fabricate a non-aqueous electrolyte secondary battery of Example 13. The non-aqueous electrolyte secondary battery of Example 13 had a design capacity of 1060 mAh and the utilizing rate (%) of negative electrode was 45%.

Next, the non-aqueous electrolyte secondary battery of Example 13 was subjected to initial charging and discharging under room temperature of 25° C. The non-aqueous electrolyte secondary battery was charged at a constant current of 212 mA until the voltage became 4.2 V. Further, the non-aqueous electrolyte secondary battery was charged at the constant voltage of 4.2 V until the current became 53 mA and then discharged at the constant current of 212 mA until the voltage became 2.75 V. Thus, an initial charging and discharging was performed.

Then, the non-aqueous electrolyte secondary battery of Example 13 after initial charging and discharging was charged and discharged under room temperature of 25° C. in cycles as follows. In one cycle, the non-aqueous electrolyte secondary battery was charged at a constant current of 1060 mA until the voltage became 4.2 V and further charged at a constant voltage of 4.2 V until the current became 53 mA and thereafter discharged at the constant current of 1060 mA until the voltage became 2.75 V. Such a charging and discharging cycle was repeated one hundred fifty times. Then, the percentage of capacity preservation of Example 13 at one hundred fiftieth cycle under room temperature of 25° C. was determined.

Further, the non-aqueous electrolyte secondary battery of Example 13 after initial charging and discharging was charged and discharged under high temperature of 45° C. in cycles as follows. In one cycle, the non-aqueous electrolyte secondary battery of Example 13 was charged at the constant current of 1060 mA until the voltage became 4.2 V and further charged at a constant voltage of 4.2 V until the current became 53 mA, and thereafter discharged at the constant current of 1060 mA until the voltage became 2.75 V. Such a charging and discharging cycle was repeated one hundred fifty times. Then, the percentage of capacity preservation of Example 13 at one hundred fiftieth cycle under high temperature of 45° C. was determined.

Comparative Example 10

In Comparative Example 10, in preparation of the positive electrode of Example 1, the amount of the positive electrode composite slurry applied on the positive electrode current collector was changed. Thus, a positive electrode of Comparative Example 10 having a thickness of 159 μm, an amount of the positive electrode composite on the positive electrode current collector of 54 mg/cm$^2$, and a filling density of positive electrode composite of 3.75 g/cc was prepared.

In Comparative Example 10, in preparation of the negative electrode of Example 1, the amount of the negative electrode composite slurry applied on the negative electrode current collector was changed. Thus, a negative electrode of Comparative Example 10 in which an amount of the negative electrode composite applied on the negative electrode current collector was 3.6 mg/cm$^2$ was prepared. The negative electrode of Comparative Example 10 after sintering had a thickness of 40 μm.

Then, the positive electrode and the negative electrode prepared as above and the non-aqueous electrolyte of Example 1 were used to fabricate a non-aqueous electrolyte secondary battery of Comparative Example 10. The non-aqueous electrolyte secondary battery of Comparative Example 10 had a design capacity of 1140 mAh and the utilizing rate (%) of negative electrode was 63%.

Next, the non-aqueous electrolyte secondary battery of Comparative Example 10 was subjected to initial charging and discharging under room temperature of 25° C. The non-aqueous electrolyte secondary battery was charged at a constant current of 228 mA until the voltage became 4.2 V. Further, the non-aqueous electrolyte secondary battery was charged at the constant voltage of 4.2 V until the current became 48 mA and then discharged at the constant current of 228 mA until the voltage became 2.75 V. Thus, the initial charging and discharging was performed.

Then, the non-aqueous electrolyte secondary battery of Comparative Example 10 after initial charging and discharging was charged and discharged under room temperature of 25° C. in cycles as follows. In one cycle, the non-aqueous electrolyte secondary battery was charged at a constant current of 1140 mA until the voltage became 4.2 V and further charged at a constant voltage of 4.2 V until the current became 57 mA and thereafter discharged at the constant current of 1140 mA until the voltage became 2.75 V. Such a charging and discharging cycle was repeated one hundred fifty times. Then, the percentage of capacity preservation of Comparative Example 10 at one hundred fiftieth cycle under room temperature of 25° C. was determined.

Further, the non-aqueous electrolyte secondary battery of Comparative Example 10 after initial charging and discharging was charged and discharged under high temperature of 45° C. in cycles as follows. In one cycle, the non-aqueous electrolyte secondary battery of Comparative Example 10 was charged at the constant current of 1140 mA until the voltage became 4.2 V and further charged at a constant voltage of 4.2 V until the current became 57 mA, and thereafter discharged at the constant current of 1140 mA until the voltage became 2.75 V. Such a charging and discharging cycle was repeated one hundred fifty times. Then, the percentage of capacity preservation of Comparative Example 10 at one hundred fiftieth cycle under high temperature of 45° C. was determined.

Next, as to each of the non-aqueous electrolyte secondary batteries of Example 13 and Comparative Example 10, each cycle life under room temperature of 25° C. and under high temperature of 45° C. was determined by using the index wherein the percentage of capacity preservation of Example 1 at one hundred fiftieth cycle under room temperature of 25° C. was defined as cycle life 100. The results are shown in Table 3 below.

TABLE 3

| | Adhesion Method of Negative electrode active material | Non-aqueous electrolyte | | | | Utilizing Rate of Negative Electrode (%) | Cycle life | |
|---|---|---|---|---|---|---|---|---|
| | | Type and Volume Ratio of Non-aqueous solvent | | Additive Agent | | | | |
| | | FEC | MEC | Type | Mass % | | Room Temperature | High Temperature |
| Ex. 1 | Application | 20 | 80 | Diisocyanate A | 1 | 40 | 100 | 99 |
| Ex. 13 | Application | 20 | 80 | Diisocyanate A | 1 | 45 | 96 | 95 |
| Comp. Ex. 10 | Application | 20 | 80 | Diisocyanate A | 1 | 63 | 58 | 42 |

According to the results, both of the cycle life under room temperature of 25° C. and the cycle life under high temperature of 45° C. in the non-aqueous electrolyte secondary battery of Comparative Example 10 having 63% of utilizing rate of negative electrode were greatly decreased as compared with each of the non-aqueous electrolyte secondary batteries of Examples 1 and 13 having 45% or less of utilizing rate of negative electrode. The reason is thought to be as follows. If depth of charging and discharging is deep as in the non-aqueous electrolyte secondary battery of Comparative Example 10, expansion and contraction of silicon become large and a lot of activated surfaces newly appear, and as a result, a reaction between the activated surfaces and the non-aqueous electrolyte becomes excessive. Therefore, it is impossible to perform stable charging and discharging in Comparative Example 10.

Comparative Example 11

In Comparative Example 11, the positive electrode and the negative electrode fabricated as above were used. As the non-aqueous electrolyte, the same non-aqueous electrolyte of Comparative Example 1 wherein diisocyanate A was not added was used.

In Comparative Example 11, in preparation of the positive electrode of Example 1, the amount of the positive electrode composite slurry applied on the positive electrode current collector was changed. Thus, a positive electrode of Comparative Example 11 having a thickness of 148 μm, an amount of the positive electrode composite on the positive electrode current collector of 49.8 mg/cm$^2$, and a filling density of positive electrode composite of 3.75 g/cc was prepared.

In preparation of a negative electrode of Comparative Example 11, artificial graphite having an average particle diameter of 20 μm was used as a negative electrode active material. Then, the artificial graphite as the negative electrode active material and styrene-butadiene rubber as viscosity improver were blended with an aqueous solution dissolving carboxymethyl cellulose as viscosity improver in water of dispersion medium to give negative electrode composite slurry. The mass ratio of the negative electrode active material, the binding agent and the viscosity improver was 97.5:1:1.5. As a negative electrode current collector, an electrolytic copper foil having 9 μm thickness, 317 mm length and 52 mm width was used. The positive electrode composite slurry was applied on one side of the positive electrode current collector. Here, the length and width of the positive electrode composite slurry applied on the one side of the positive electrode current collector were 284 mm and 52 mm. Next, the positive electrode composite slurry was applied on the other side of the positive electrode current collector. Here, the length and width of the positive electrode composite slurry applied on the other side of the positive electrode current collector were 226 mm and 52 mm. Then, the resultant was dried and rolled. Here, the amount of positive electrode composite applied on parts of the both sides of the positive electrode current collector was 19.3 mg/cm$^2$, and thickness of the parts of the negative electrode was 130 μm.

Except for the use of the positive electrode and the negative electrode fabricated as above, the same procedure as in Example 1 was used to fabricate a non-aqueous electrolyte secondary battery of Comparative Example 11 having a design capacity of 830 mAh.

Comparative Example 12

In Comparative Example 12, in fabrication of the non-aqueous electrolyte secondary battery of Comparative Example 11, as the non-aqueous electrolyte, the same non-aqueous electrolyte of Example 1 wherein 1 mass % of diisocyanate A was added was used. A design capacity of a non-aqueous electrolyte secondary battery of Comparative Example 11 was 830 mAh.

Next, each of the non-aqueous electrolyte secondary batteries of Comparative Examples 11 and 12 was subjected to initial charging and discharging under room temperature of 25° C. Each of the non-aqueous electrolyte secondary batteries was charged at a constant current of 116 mA until the voltage became 4.2 V. Further, each of the non-aqueous electrolyte secondary batteries was charged at the constant voltage of 4.2 V until the current became 41 mA and then discharged at the constant current of 116 mA until the voltage became 2.75 V. Thus, the initial charging and discharging was performed.

Then, each of the non-aqueous electrolyte secondary batteries of Comparative Examples 11 and 12 after initial charging and discharging was charged and discharged under room temperature of 25° C. in cycles as follows. In one cycle, each non-aqueous electrolyte secondary battery was charged at a constant current of 830 mA until the voltage became 4.2 V and further charged at a constant voltage of 4.2 V until the current became 41 mA and thereafter discharged at the constant current of 830 mA until the voltage became 2.75 V. Such a charging and discharging cycle was repeated one hundred fifty times. Then, the percentage of capacity preservation of each of the non-aqueous electrolyte secondary batteries of Comparative Examples 11 and 12 at one hundred fiftieth cycle under room temperature of 25° C. was determined.

Further, the non-aqueous electrolyte secondary batteries of Comparative Examples 11 and 12 after initial charging and discharging was charged and discharged under high temperature of 45° C. in cycles as follows. In one cycle, each of the non-aqueous electrolyte secondary batteries of Comparative Examples 11 and 12 was charged at the constant current of 830 mA until the voltage became 4.2 V and further charged at a constant voltage of 4.2 V until the current became 41 mA, and thereafter discharged at the constant current of 830 mA until the voltage became 2.75 V. Such a charging and discharging cycle was repeated one hundred fifty times. Then, the percentage of capacity preservation of each of the non-aqueous electrolyte secondary batteries of Comparative Example 11 and 12 at one hundred fiftieth cycle under high temperature of 45° C. was determined.

Next, as to each of the non-aqueous electrolyte secondary batteries of Comparative Examples 11 and 12, each cycle life under room temperature of 25° C. and under high temperature of 45° C. was determined by using the index wherein the percentage of capacity preservation of the non-aqueous electrolyte secondary battery of Comparative Example 11 at one hundred fiftieth cycle under room temperature of 25° C. was defined as cycle life 100. The results are shown in Table 4 below.

TABLE 4

| | Negative electrode active material | Non-aqueous electrolyte | | | | Cycle life | |
|---|---|---|---|---|---|---|---|
| | | Type and Volume Ratio of Non-aqueous solvent | | Additive Agent | | Room Temperature | High Temperature |
| | | FEC | MEC | Type | Mass % | | |
| Comp. Ex. 11 | Artificial graphite | 20 | 80 | — | — | 100 | 97 |
| Comp. Ex. 12 | Artificial graphite | 20 | 80 | Diisocyanate A | 1 | 98 | 99 |

As is apparent from the table above, in each of the non-aqueous electrolyte secondary batteries of Comparative Examples 11 and 12 using the artificial graphite of the negative electrode active material, although Comparative Example 11 used the non-aqueous electrolyte containing diisocyanate A in addition to fluorinated cyclic carbonate and Comparative Example 12 used the non-aqueous electrolyte not containing diisocyanate A, the cycle life under room temperature of 25° C. and the cycle life under high temperature of 45° C. were almost same.

Accordingly, the remarkable improvement in the cycle life under high temperature of 45° C. in the use of the non-aqueous electrolyte containing diisocyanate such as diisocyanate A in addition to fluorinated cyclic carbonate is found to be peculiar effect obtained in the non-aqueous electrolyte secondary battery which used the negative electrode active material of silicon and/or silicon alloy.

Next, as to each of the non-aqueous electrolyte secondary batteries of Comparative Examples 11 and 12 after initial charging and discharging was charged and discharged under room temperature of 25° C. to determine discharge capacity QL. Each of the non-aqueous electrolyte secondary batteries of Comparative Examples 11 and 12 was charged at the constant current of 830 mA until the voltage became 4.2 V and further charged at a constant voltage of 4.2 V until the current became 41 mA, and thereafter discharged at the constant current of 830 mA until the voltage became 2.75 V. Thus, each discharge capacity QL of each non-aqueous electrolyte secondary battery was determined.

Then, each of the non-aqueous electrolyte secondary batteries of Comparative Examples 11 and 12 was charged and discharged under room temperature of 25° C. to determine discharge capacity at high current QH. Each of the non-aqueous electrolyte secondary batteries of Comparative Examples 11 and 12 was charged at the constant current of 830 mA until the voltage became 4.2 V and further charged at a constant voltage of 4.2 V until the current became 41 mA, and thereafter discharged at the constant high current of 2490 mA until the voltage became 2.75 V. Thus, each discharge capacity at high current QH of each non-aqueous electrolyte secondary battery was determined.

After that, as to each of the non-aqueous electrolyte secondary batteries of Comparative Examples 11 and 12, high-rate discharge performances were obtained according to the below equation. The results are shown in Table 5 below.

High-rate discharge performances(%)=$(QH/QL) \times 100$

Next, as to each of the non-aqueous electrolyte secondary batteries of Example 1 and Comparative Example 1 after initial charging and discharging was charged and discharged under room temperature of 25° C. to determine discharge capacity QL. Each of the non-aqueous electrolyte secondary batteries was charged at the constant current of 950 mA until the voltage became 4.2 V and further charged at a constant voltage of 4.2 V until the current became 48 mA, and thereafter discharged at the constant current of 950 mA until the voltage became 2.75 V. Thus, each discharge capacity QL of each of the non-aqueous electrolyte secondary batteries of Example 1 and Comparative Example 1 was determined.

Then, each of the non-aqueous electrolyte secondary batteries of Example 1 and Comparative Example 1 was charged and discharged under room temperature of 25° C. to determine discharge capacity at high current QH. Each of the non-aqueous electrolyte secondary batteries was charged at the constant current of 950 mA until the voltage became 4.2 V and further charged at a constant voltage of 4.2 V until the current became 48 mA, and thereafter discharged at the constant high current of 2580 mA until the voltage became 2.75 V. Thus, each discharge capacity at high current QH of each of the non-aqueous electrolyte secondary batteries of Example 1 and Comparative Example 1 was determined.

After that, as to each of the non-aqueous electrolyte secondary batteries of Example 1 and Comparative Example 1, high-rate discharge performances were obtained. The results are shown together with the results of the non-aqueous electrolyte secondary batteries of Comparative Examples 11 and 12 in Table 5 below.

TABLE 5

| | Negative electrode active material | Non-aqueous electrolyte | | | | High-rate discharge performances |
|---|---|---|---|---|---|---|
| | | Type and Volume Ratio of Non-aqueous solvent | | Additive Agent | | |
| | | FEC | MEC | Type | Mass % | |
| Comp. Ex. 11 | Artificial graphite | 20 | 80 | — | — | 40 |
| Comp. Ex. 12 | Artificial graphite | 20 | 80 | Diisocyanate A | 1 | 35 |

TABLE 5-continued

| | Negative electrode active material | Non-aqueous electrolyte | | | | High-rate discharge performances |
|---|---|---|---|---|---|---|
| | | Type and Volume Ratio of Non-aqueous solvent | | Additive Agent | | |
| | | FEC | MEC | Type | Mass % | |
| Example 1 | Si | 20 | 80 | Diisocyanate A | 1 | 90 |
| Comp. Ex. 1 | Si | 20 | 80 | — | — | 91 |

As is apparent from Table 5 the above, in each of the non-aqueous electrolyte secondary batteries of Comparative Examples 11 and 12 which utilized the negative electrode active material of artificial graphite, the high-rate discharge performances were greatly decreased as compared with each of the non-aqueous electrolyte secondary batteries of Example 1 and Comparative Example 1 which utilized the negative electrode active material of silicon. The reason is supposed to be as follows. In a case where silicon is used as the negative electrode active material, lithium is inserted and de-inserted from all directions of the negative electrode active material by charging and discharging, so that charge-discharge performances are improved. On the other hand, in a case where artificial graphite is used as the negative electrode active material, the artificial graphite has an orientation. As a result, charge-discharge performances are deteriorated.

| EXPLANATION OF REFERENCE NUMERALS | |
|---|---|
| 10 | flat electrode |
| 1 | positive electrode |
| 1a | positive electrode current collector tub |
| 2 | negative electrode |
| 2a | negative electrode current collector tub |
| 3 | separator |
| 20 | battery case |

What is claimed:

1. A non-aqueous electrolyte secondary battery, comprising:
a positive electrode;
a negative electrode;
a separator interposed between the positive electrode and the negative electrode; and
a non-aqueous electrolyte dissolving a solute in a non-aqueous solvent;
wherein the negative electrode comprises a negative electrode active material containing particulate silicon and/or silicon alloy and a binding agent,
wherein the non-aqueous electrolyte contains fluorinated cyclic carbonate and diisocyanate compound of the general formula (1) below, and
when Li storage volume per unit area of the negative electrode of the non-aqueous electrolyte secondary battery under charging condition is determined as A and the theoretical maximum Li storage volume per unit area of the negative electrode is determined as B, a utilizing rate (%) of negative electrode which is expressed by (A/B)×100 is 45% or less:

$$OCN-CH_2-A-CH_2-NCO \quad (1)$$

wherein A represents at least one selected from a chain saturated hydrocarbon group and an aromatic hydrocarbon group expressed by the general formula (b) below, and wherein $R_3$ to $R_6$ represent a hydrogen group or an alkyl group:

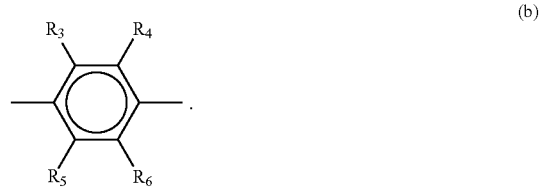

(b)

2. The non-aqueous electrolyte secondary battery as claimed in claim 1,
wherein the diisocyanate compound is a straight chain diisocyanate compound expressed by the general formula (2) below:

$$OCN-(CH_2)_x-NCO \quad (2)$$

wherein x is an integral number of 3 or more.

3. The non-aqueous electrolyte secondary battery as claimed in claim 2,
wherein x in the general formula (2) is within a range of 4 to 12.

4. The non-aqueous electrolyte secondary battery as claimed in claim 2,
wherein x in the general formula (2) is within a range of 6 to 12.

5. The non-aqueous electrolyte secondary battery as claimed in claim 1,
wherein the diisocyanate compound is at least one of diisocyanate compounds expressed by chemical formulas (3) to (5) below:

$$OCN-CH_2-CH(CH_3)-CH_2-C(CH_3)_2-(CH_2)_2-NCO \quad (3)$$

$$OCN-CH_2-C(CH_3)_2-CH_2-CH(CH_3)-(CH_2)_2-NCO \quad (4)$$

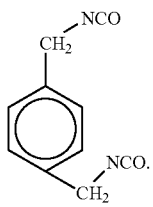

(5)

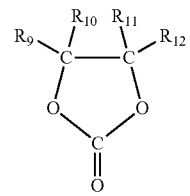

(6)

6. The non-aqueous electrolyte secondary battery as claimed in claim 1,
wherein the diisocyanate compound is added in a range of 0.1 to 5 mass % with regard to the non-aqueous electrolyte excluding the diisocyanate compound.

7. The non-aqueous electrolyte secondary battery as claimed in claim 1,
wherein the negative electrode is fabricated by applying a negative electrode composite containing the negative electrode active material of particulate silicon and/or silicon alloy and the binding agent on the surface of a negative electrode current collector and
sintering under a non-oxidizing atmosphere at a temperature which is not lower than a glass transition temperature of the binding agent.

8. The non-aqueous electrolyte secondary battery as claimed in claim 1,
wherein the binding agent is polyimide.

9. The non-aqueous electrolyte secondary battery as claimed in claim 1,
wherein the fluorinated cyclic carbonate is cyclic carbonate having a fluorine group expressed by the general formula (6) below:

wherein $R_9$ to $R_{12}$ represent a group selected from a hydrogen group and a fluorine group and at least one is the fluorine group.

10. The non-aqueous electrolyte secondary battery as claimed in claim 9,
wherein the fluorinated cyclic carbonate is 4-fluoro-1,3-dioxolan-2-one.

11. The non-aqueous electrolyte secondary battery as claimed in claim 1,
wherein A in the diisocyanate compound expressed by the general formula (1) is a straight chain diisocyanate compound expressed by the general formula (a) below:

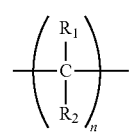

(a)

wherein $R_1$ to $R_2$ represent the hydrogen group or the alkyl group and n is a natural number.

\* \* \* \* \*